United States Patent Office 3,766,231
Patented Oct. 16, 1973

3,766,231
COMPOUNDS OF ZERO-VALENT NICKEL CONTAINING N-BONDED NITRILES
Lawrence Wayne Gosser and Chadwick Alma Tolman, Wilmington, Del., assignors to E. I. du Pont de Nemours and Company, Wilmington, Del.
No Drawing. Filed Aug. 2, 1971, Ser. No. 168,353
Int. Cl. C07f 15/04
U.S. Cl. 260—439 R                3 Claims

ABSTRACT OF THE DISCLOSURE

An N-bonded nitrile complex of zero-valent nickel having the formula Ni(PXYZ)$_3$R'CN wherein X is OR, Y and Z are R or OR and R is an alkyl or aryl radical having up to 18 carbon atoms, a given PXYZ ligand having a cone angle with an average value between 130° and 200°, and R' is an alkyl, cyano substituted alkyl, alkenyl, aryl or fluorine substituted aryl radical of 1 to 20 carbon atoms. The compounds are useful in the hydrocyanation of olefinic compounds.

BACKGROUND OF THE INVENTION

A number of nickel compounds have been described which contain unsaturated nitriles bonded to nickel through an olefin group. However, there has been no description of zero-valent nickel complexes wherein a nitrile is bonded to nickel through the nitrogen atom.

STATEMENT OF INVENTION

The present invention relates to N-bonded nitrile complexes of zero-valent nickel represented by the formula Ni(PXYZ)$_3$R'CN wherein X is OR, Y and Z are R or OR and R is an alkyl or aryl radical having up to 18 carbon atoms. The R radicals of a given ligand may be the same or different, they may be cojoined and may be functionally substituted, so long as the substituents do not themselves react with zero-valent nickel. The R radicals are so chosen that a given ligand has a cone angle with an average value between 130° and 200°. Cone angle is determined as described by C. A. Tolman, J. Am. Chem. Soc., 92, 2956 (1970). The triply connected phosphorus ligands can be phosphite, phosphonite or phosphinite.

In the definition of this invention, R'CN is an organo nitrile. More specifically, in R'CN, R' is an alkyl, cyano substituted alkyl, aryl, fluorine substituted aryl or alkenyl radical wherein the carbon-carbon double bond is insulated from the nitrile by at least one carbon atom, the radical having 1–20 carbon atoms.

Because of the sensitivity of the compounds to oxygen, the preparation of these complexes should be carried out in an inert atmosphere, such as nitrogen or argon. The compounds are most conveniently prepared by the direct reaction of the nitriles with a Ni(O)-phosphorus complex NiL$_3$ (L=PXYZ), by contacting the nitrile with the Ni(O) complex in the presence or absence of an inert solvent, such as acetone, toluene, benzene, or cyclohexane. Various ratios of nitrile: Ni can be employed, but a ratio of 1:1 to 20:1 is preferred. Excess nitrile may be removed under reduced pressure or by crystallization in some cases. Reaction temperatures of −75° to +200° C. can be used. The temperature is not critical as the reaction is very fast, once all the nickel(O) complex is in solution. Temperatures of −25° to +50° are preferred in order to avoid thermal decomposition. Compounds other than the NiL$_3$ may be suitable sources of Ni(O), so long as undesirable ligands may be removed from the reaction mixture. Examples might be NiL$_4$, N$_2$NiL$_3$, (olefin)NiL$_2$, or other (nitrile)NiL$_3$. In the case of (olefin) NiL$_2$, for example, L and RCN can be added to (C$_2$H$_4$)NiL$_2$ and the ethylene removed under vacuum. In other cases, RCN NiL$_3$ compounds may be prepared directly by reducing a Ni(II) complex such as Ni(NO$_3$)$_2$·6H$_2$O in the presence of a bulky phosphorus ligand in a nitrile solvent by a reducing agent such as NaBH$_4$, metallic Zn, or AlEt$_3$.

The compounds of this invention are useful in the hydrocyanation of olefinic compounds, for example, in the hydrocyanation of 3-pentenenitrile or 4-pentenenitrile to adiponitrile.

DESCRIPTION OF PREFERRED EMBODIMENTS

The preferred complexes are those wherein the PXYZ ligand is tri-o-tolylphosphite or tri-(2,5-xylyl) phosphite and R'CN is acetonitrile, 3-pentenenitrile, 4-pentenenitrile, adiponitrile or methylglutaronitrile.

The invention is further described in the examples to follow, which are intended to illustrate but not to limit the scope of the defined invention.

The nuclear magnetic resonance (NMR) measurements are carried out as described in "High Resolution Nuclear Magnetic Resonance Spectroscopy," J. W. Emsley, J. Feeney and L. H. Sutcliffe, Pergamon Press (1965). Infrared measurements are carried out as described in "Infrared Spectra of Complex Molecules," L. J. Bellamy, John Wiley & Sons, New York, 2nd ed. (1958).

EXAMPLE 1

To 0.47 g. Ni[P(O-o-C$_6$H$_4$CH$_3$)$_3$]$_3$ prepared as described by L. W. Gosser and C. A. Tolman, Inorganic Chemistry, 9, 2350 (1970) (0.4 mmole-cone angle 141°) in a glass tube equipped with a 19/22 inner ground glass joint and a Teflon® coated magnetic stirring bar was added 1 cc. CH$_3$CN (19 mmoles). In about one minute stirring at 25° the red solid dissolved to give a brown solution. Excess nitrile was removed under suction at a pressure of about 1 mm. in a period of about 0.5 hour. The product was a brownish-white solid foam decomposing at 48–78° C. The infrared spectrum in benzene showed a band at 2263 cm.$^{-1}$ due to $\gamma_{CN}$ in the complex (CH$_3$CN)Ni[P(O-o-C$_6$H$_4$CH$_3$)$_3$]$_3$. [Free CH$_3$CN in benzene absorbs at 2255 cm.$^{-1}$.] The proton NMR spectrum in C$_6$D$_6$ showed four resonances at $\tau$ 2.28, 3.16, 7.93, and 9.44 in the ratio of 9:27:27:3 as expected for ortho-H of L, unresolved meta and para-H of L, —CH$_3$ of L, and CH$_3$CN in the complex (CH$_3$CN)Ni[P(O-o-C$_6$H$_4$CH$_3$)$_3$]$_3$

[The resonance of free CH$_3$CN in C$_6$D$_6$ is found at $\tau$ 9.29.]

EXAMPLE 2

To 1.07 g. Ni[P(O-o-C$_6$H$_4$CH$_3$)$_3$]$_3$ (1 mmole) and 3 cc. acetone in a 25 ml. Erlenmeyer flask equipped with a 19/22 inner joint and magnetic stirring bar was added 1 cc. CH$_3$CN (19 mmoles). Within one minute at 25° the solid dissolved to give a green-brown solution. Removal of excess CH$_3$CN under vacuum gave a fluffy gold solid. The infrared spectrum was identical to that of the product of Example 1. The elemental analysis was consistent with the composition (CH$_3$CN)Ni[P(O-o-C$_6$H$_4$CH$_3$)$_3$]$_4$. Calculated for C$_{65}$H$_{66}$NNiO$_9$P$_3$ (percent): C, 67.5; H, 5.8; N, 1.2; Ni, 5.1. Found (percent): C, 66.0; H, 5.8; N, 1.2; Ni, 4.6.

EXAMPLES 3–13

The nitrile complexes shown in Table I were prepared in solution by the addition of 0.2 mmole organic nitrile to 0.11 g. (0.1 mmole) Ni[P(O-o-$C_6H_4CH_3$)$_3$]$_3$ suspended in 1.4 cc. toluene. On shaking, the red-orange NiL$_3$ complex dissolved and the solution changed from red-orange to yellow (or orange in the case of benzonitrile), indicating a reaction with the nitrile. The $^{31}$P NMR spectra of the solutions no longer showed a resonance at −128.2 p.p.m. (85% $H_3PO_4$) characteristic of NiL$_3$, but a new resonance in the range of −130.2 to −131.3 p.p.m., characteristic of an N-bonded (nitrile)

Ni[P(O-o-$C_6H_4CH_3$)$_3$]$_3$ complex. In a few cases, weak broad resonances due to (olefin)NiL$_2$ complexes were also observed at about −137 p.p.m.

EXAMPLE 14

To 0.045 g. bis(tri-2,5-xylyl phosphite)nickel ethylene (0.05 mmole) was added 0.02 g. tri-2,5-xylyl phosphite (0.05 mmole), 5 μl. $C_6H_5CN$ (0.05 mmole), and 0.25 cc. toluene. The infrared spectrum of the solution, recorded in an 0.1 mm. cell, showed a band at 2208 cm.$^{-1}$, indicating the presence of N-bonded nitrile in the complex ($C_6H_5CN$)Ni[P(O-2,5-($CH_3$)$_2C_6H_3$)$_3$]$_3$. [Free $C_6H_5CN$ in toluene absorbs at 2229 cm.$^{-1}$.] Tri-2,5-xylyl phosphite has a cone angle of 144°.

EXAMPLES 15–18

The nitrile complexes shown in Table II were prepared in toluene solution by the addition of organic nitrile in a 1:1 mole ratio to the appropriate tris(triaryl phosphite)Ni(O) complex. Infrared spectra, recorded in an 0.1 mm. cell, indicate the presence of the N-bonded nitrile complexes shown.

TABLE I.—EXAMPLES 3-13

[$^{31}$P nmr. data for (nitrile)Ni[P(O-o-$C_6H_4CH_3$)$_3$]$_3$ complexes formed in toluene at 26° chem. shifts with respect to 85% $H_3PO_4$]

| Example | Nitrile [a] | (Nitrile) NiL$_3$ | (Olefin) NiL$_2$ [b] |
|---|---|---|---|
| 3 | $CH_3CN$ | −131.0 | |
| 4 | VN | −130.5 | |
| 5 | ADN | −130.7 | |
| 6 | MGN | −130.5 | |
| 7 | 4PN | −130.4 | −137.3 |
| 8 | T3PN | −130.8 | |
| 9 | 2M3BN | −130.2 | −137.0 |
| 10 | C2M2BN | −130.9 | |
| 11 | T2PN | −131.2 | −136.3 |
| 12 | $C_6H_5CN$ | −131.2 | |
| 13 | p-F-$C_6H_4CN$ | −131.3 | |

[a] Abbreviations: VN, valeronitrile; ADN, adiponitrile; MGN, methyl glutaronitrile; 4PN, 4-pentenenitrile; T3PN, trans-3-pentenenitrile; 2M3BN, 2-methyl-3-butenenitrile; C2M2BN, bis-2-methyl-2-butenenitrile; T2PN, trans-2-pentenenitrile; L=tri-o-tolyl phosphite.
[b] Chemical shift is the average of (olefin)NiL$_2$ and free L in rapid exchange. Isolated ($C_2H_4$)(Ni[P(O-o-tolyl)$_3$]$_3$ shows a resonance at −139.7 while free L is at −130.0.

TABLE II.—EXAMPLES 15-19

[Infrared data for (nitrile)NiL$_3$ complexes in toluene]

| Example | Complex | $\mu_{CN}$(cm.$^{-1}$) |
|---|---|---|
| 15 | ($C_6H_5CN$)Ni[P(O-2,4-($CH_3$)$_2C_6H_3$)$_3$]$_3$ | 2,213 |
| 16 | ($C_6H_5CN$)Ni[P(O-o-$C_6H_4CH_3$)$_3$]$_3$ | 2,217 |
| 17 | ($C_6H_5CN$)Ni[P(O-2-$CH_3$-4-Cl-$C_6H_3$)$_3$]$_3$ | 2,217 |
| 18 | ($CH_3CN$)Ni[P(O-2-$CH_3$-4-Cl-$C_6H_3$)$_3$]$_3$ | 2,261 |

What is claimed is:
1. An N-bonded nitrile complex of zero-valent nickel of the formula Ni(PXYZ)$_3$R'CN wherein X is OR, Y and Z are R or OR and R is an alkyl or aryl radical having up to 18 carbon atoms; wherein the R radicals of a given PXYZ ligand may be cojoined and may be the same or different and are so chosen that the ligand has a cone angle with an average value between 130° and 200°; wherein R' in R'CN is of the class consisting of alkyl, cyano substituted alkyl, aryl, fluorine substituted aryl, and alkenyl radicals having 1–20 carbon atoms and wherein the carbon-carbon double bond of the alkenyl radical is insulated from the nitrile in R'CN by at least one carbon atom.

2. The product of claim 1 wherein PXYZ is of the class consisting of tri-o-tolyl phosphite and tri-(2,5-xylyl) phosphite.

3. The product of claim 1 wherein R'CN is of the class consisting of acetonitrile, 3-pentenenitrile, 4-pentenenitrile, methylglutaronitrile and adiponitrile.

References Cited

UNITED STATES PATENTS 3,536,748   10/1970   Drinkard et al.   260—439 R
3,346,608   10/1967   Kutepow et al.   260—439 R

OTHER REFERENCES

Candlin et al.: Reactions of Transition-Metal Complexes, Elsevier Publishing Co., New York, N.Y., 1968, pp. 107–8.

Gosser et al.: Inorg. Chem., 9 (1970), pp. 2350–3.

Seidel et al.: Inorg. Chem., 9 (1970), pp. 2354–7.

Tolman.: Inorg. Chem., 10 (1971), pp. 1540–1.

DANIEL E. WYMAN, Primary Examiner

A. P. DEMERS, Assistant Examiner

U.S. Cl. X.R.

260—465.8